United States Patent
Kumagai et al.

(10) Patent No.: US 10,780,386 B2
(45) Date of Patent: Sep. 22, 2020

(54) LIQUID FILM DUST ARRESTER AND FLUE GAS DESULFURIZATION SYSTEM

(71) Applicant: CHIYODA CORPORATION, Yokohama-shi, Kanagawa (JP)

(72) Inventors: Kazuya Kumagai, Yokohama (JP); Hirokazu Yasuda, Yokohama (JP); Naobumi Kurosaki, Yokohama (JP)

(73) Assignee: CHIYODA CORPORATION, Yokohama-shi (JP)

( * ) Notice: Subject to any disclaimer, the term of this patent is extended or adjusted under 35 U.S.C. 154(b) by 199 days.

(21) Appl. No.: 15/778,111

(22) PCT Filed: Nov. 29, 2016

(86) PCT No.: PCT/JP2016/004999
§ 371 (c)(1),
(2) Date: May 22, 2018

(87) PCT Pub. No.: WO2017/098698
PCT Pub. Date: Jun. 15, 2017

(65) Prior Publication Data
US 2018/0345202 A1  Dec. 6, 2018

(30) Foreign Application Priority Data

Dec. 7, 2015 (JP) .................. 2015-238296

(51) Int. Cl.
*B01F 3/04* (2006.01)
*B01D 47/00* (2006.01)
(Continued)

(52) U.S. Cl.
CPC ........... *B01D 47/022* (2013.01); *B01D 45/10* (2013.01); *B01D 47/06* (2013.01); *B01D 53/18* (2013.01);
(Continued)

(58) Field of Classification Search
CPC .... B01F 3/04021; B01F 3/04; B01F 3/04049; B01F 3/04007
(Continued)

(56) References Cited

U.S. PATENT DOCUMENTS 5,741,340 A    4/1998  Klemmer
5,743,469 A *  4/1998  Reintanz .............. B01D 53/504
                                                          134/82

(Continued)

FOREIGN PATENT DOCUMENTS

CN    103338841 A    10/2013
EP      2495029 A1    9/2012
(Continued)

OTHER PUBLICATIONS

International Search Report dated Jan. 10, 2017, issued in counterpart application No. PCT/JP2016/004999, w/English translation. (5 pages).

(Continued)

*Primary Examiner* — Robert A Hopkins
(74) *Attorney, Agent, or Firm* — Westerman, Hattori, Daniels & Adrian

(57) ABSTRACT

A liquid film dust arrester is installed to face a gas flow containing dust and flowing out from a gas discharge pipe. The arrester includes a gas flow blocking unit arranged vis-à-vis the gas flow, a liquid dispersion unit having a dispersion section arranged at a position near the center of the gas flow blocking unit and upstream relative to the gas flow blocking unit as viewed in the flowing direction of the gas flow so as to face the gas flow blocking unit, a liquid ejection unit having an ejection port disposed vis-à-vis the dispersion section and configured to eject liquid from the ejection port, and a liquid film forming unit. The dispersion section comprises a smooth surface that causes the ejected (Continued)

liquid to flow and disperse on the smooth surface, and the liquid film is formed to face the gas flow flowing through the flow path.

8 Claims, 4 Drawing Sheets

(51) Int. Cl.
    *B01D 47/02*     (2006.01)
    *B01D 45/10*     (2006.01)
    *B01D 53/18*     (2006.01)
    *B01D 53/75*     (2006.01)
    *B01D 47/06*     (2006.01)
    *F23J 15/04*     (2006.01)
    *B01D 53/50*     (2006.01)
    *B01D 53/78*     (2006.01)

(52) U.S. Cl.
    CPC ........... *B01D 53/50* (2013.01); *B01D 53/504* (2013.01); *B01D 53/75* (2013.01); *B01D 53/78* (2013.01); *B01F 3/04021* (2013.01); *B01F 3/04049* (2013.01); *F23J 15/04* (2013.01); *B01D 2247/04* (2013.01); *B01D 2258/0283* (2013.01); *B01D 2258/0291* (2013.01); *F23J 2215/20* (2013.01)

(58) Field of Classification Search
    USPC ....................................... 261/108, 110, 112.1
    See application file for complete search history.

(56) References Cited

U.S. PATENT DOCUMENTS

| 2014/0026753 A1 | 1/2014 | Hakansson |
| 2015/0336049 A1 | 11/2015 | Kansson |

FOREIGN PATENT DOCUMENTS

| JP | 46-7688 A | 12/1971 |
| JP | 52-25477 A | 2/1977 |
| JP | 9-865 A | 1/1997 |
| JP | 2002-66378 A | 3/2002 |
| JP | 2003-65676 A | 3/2003 |
| JP | 3621159 B2 | 2/2005 |
| JP | 2008-296152 A | 12/2008 |
| KR | 200359932 Y1 | 8/2004 |

OTHER PUBLICATIONS

Written Opinion dated Jan. 10, 2017, issued in counterpart application No. PCT/JP2016/004999. (4 pages).
Notification of Transmittal of Translation of the International Preliminary Report on Patentability (Form PCT/IB/338) issued in counterpart International Application No. PCT/JP2016/004999 dated Jun. 21, 2018, with Forms PCT/IB/373, PCT/IB/326 and PCT/ISA/237. (14 pages).
Extended Search Report dated Jun. 27, 2019, issued in counterpart EP application No. 10826610.7 (7 pages).
Office Action dated Jul. 24, 2019, issued in counterpart KR Application No. 10-2018-7019112 (7 pages).
Office Action dated Feb. 13, 2020, issued in counterpart JP Application No. 2015-238296, with English translation (8 pages).

* cited by examiner

LIQUID FILM DUST ARRESTER AND FLUE GAS DESULFURIZATION SYSTEM

TECHNICAL FIELD

This invention relates to a liquid film dust arrester and also to a flue gas desulfurization system. More specifically, the present invention relates to a liquid film dust arrester for removing dust contained in gas by means of liquid film and also to a flue gas desulfurization system equipped with one ore more than one liquid film dust arrester.

BACKGROUND ART

Electrical dust precipitators for removing dust contained in gas are introduced in various industrial plants and boilers burning coal and heavy oil among others. However, electrical dust precipitators are costly and require a large ground area for installing the dust precipitator to in turn raise the dust removal cost.

To solve the above-identified problems, PTL 1 discloses a soot separation type flue gas desulfurization system comprising a cooling/dust removal tower and a jet bubbling reactor vessel for desulfurization and dust removal of flue gas, wherein the jet bubbling reactor vessel is equipped with liquid film dust arresters. The liquid film dust arrester described in PTL 1 makes the liquid fed into it collide with a liquid dispersion panel having grooves showing a predetermined profile and radially disperse the liquid. Then, the radially dispersed liquid produces liquid film. Such liquid film is formed in the flue gas flow path so that dust is arrested by the liquid film as dust in flue gas contacts the liquid film. Thus, a flue gas desulfurization system according to PTL 1 can effectively and efficiently remove dust without requiring the use of any electrical dust precipitator.

CITATION LIST

Patent Literature

PTL 1: Japanese Patent No. 3,621,159

SUMMARY OF INVENTION

Technical Problem

However, increasingly rigorous restrictions have been imposed in recent years on the dust concentration in flue gas emitted into the atmosphere in many countries in the world. For this reason, there is a demand for liquid film dust arresters and flue gas desulfurization systems that show a dust removal performance much better than the liquid film dust arrester and flue gas desulfurization system described in PTL 1 without entailing any cost rise.

In view of the above-identified problems, it is therefore the object of the present invention to provide a liquid film dust arrester and a flue gas desulfurization system that show an excellent dust removal performance and operate at low cost.

Solution to Problem

In an aspect of the present invention, there is provided a liquid film dust arrester to be installed so as to face a gas flow flowing out from a gas discharge pipe and take dust in the gas flow into a liquid film in order to remove the dust from the gas flow, the dust arrester comprising a gas flow blocking unit arranged vis-à-vis the gas flow, a liquid dispersion unit having a dispersion section arranged at a position near the center of the gas flow blocking unit and upstream relative to the gas flow blocking unit as viewed in the flowing direction of the gas flow so as to face the gas flow blocking unit, the liquid dispersion unit, a liquid ejection unit having an ejection port disposed vis-à-vis the dispersion section and configured to eject liquid from the ejection port, and a liquid film forming unit for forming the liquid film in the flow path of the gas flow between the gas flow blocking unit and the gas discharge pipe, characterized in that the dispersion section comprises a smooth surface which operates to cause the liquid ejected from the ejection port toward the dispersion section to flow and disperse on the smooth surface and that the liquid film is so formed as to face the gas flow flowing through the flow path.

In another aspect of the present invention, there is provided a flue gas desulfurization system for removing sulfur oxides and dust from flue gas containing the sulfur oxides and the dust, the system comprising a sealed vessel, the inside of the sealed vessel being partitioned by a first partition board and a second partition board located above the first partition board into a first chamber, a second chamber arranged above and adjacent to the first chamber and a third chamber arranged above and adjacent to the second chamber, a flue gas inlet to the second chamber, a desulfurized gas outlet from the third chamber, one or more through holes formed through the first partition board, one or more flue gas dispersion pipes extending downwardly from the corresponding respective through holes to bring the first chamber and the second chamber into communication with each other so as to be able to disperse the flue gas fed into the second chamber into an absorber solution contained in the first chamber in order to absorb sulfur oxides from the dispersed flue gas, one or more gas discharge pipes keeping the first chamber and the third chamber in communication with each other and having top ends thereof projected upward from the top surface of the second partition board and one or more liquid film dust arresters arranged so as to respectively face the gas flows flowing out upward from the corresponding gas discharge pipes and take the dust in the gas flows into a liquid film in order to remove the dust from the gas flows, characterized in that at least one of the liquid film dust arresters is a liquid film dust arresters according to the present invention.

Advantageous Effects of Invention

Thus, the present invention provides a liquid film dust arrester and a flue gas desulfurization system that show an excellent dust removal performance at low cost.

DESCRIPTION OF EMBODIMENTS

Figure 1:
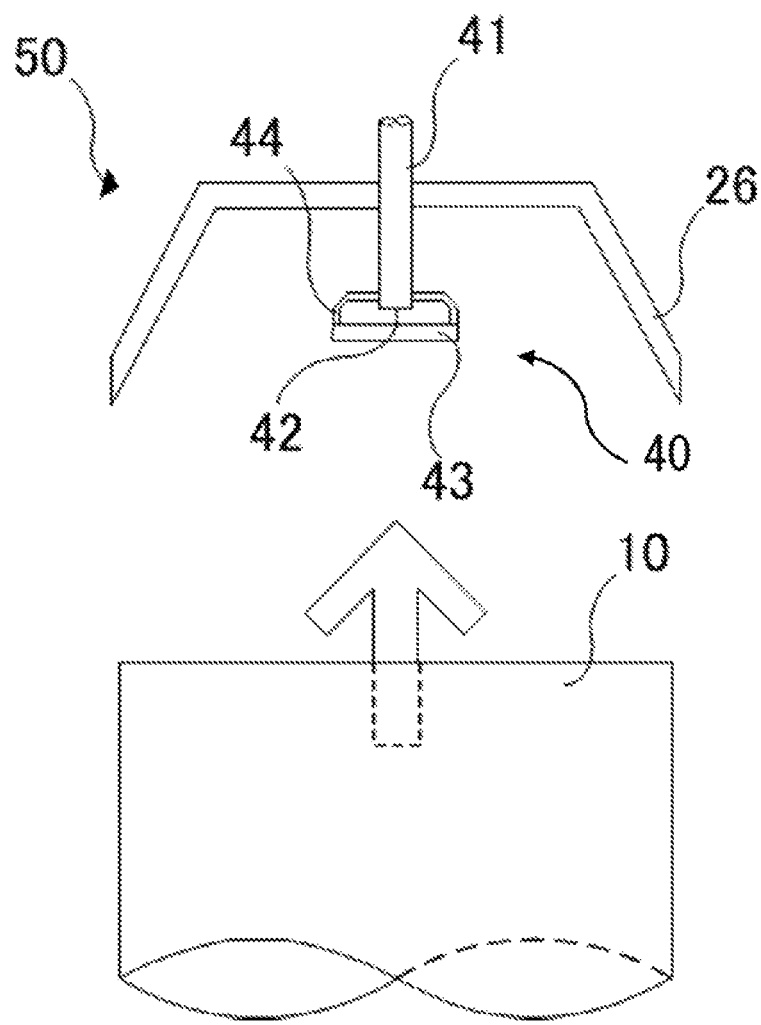
FIG. 1 is a schematic cross-sectional view of an embodiment of liquid film dust arrester according to the present invention, illustrating the configuration thereof.

Now, an embodiment of liquid film dust arrester and an embodiment of flue gas desulfurization system according to the present invention will be described below by referring to the drawings.

Note here that, while the embodiments that will be described hereinafter are currently preferred ones and involve various technical limitations, the scope of the present invention is by no means limited by the embodiments unless specifically noted otherwise hereinafter.

<Liquid Film Dust Arrester>

FIG. 1 is a schematic cross-sectional view of an embodiment of liquid film dust arrester according to the present invention, illustrating the configuration thereof.

Referring to FIG. 1, liquid film dust arrester 50 is arranged to face a gas flow flowing out from a gas discharge pipe 10 to take the dust contained in the gas flow into liquid film and remove the dust from the gas flow.

Note that, while the liquid film dust arresters 50 of an embodiment of flue gas desulfurization system are arranged vis-à-vis the gas discharge pipe 10 having a top opening for producing a gas flow that rise vertically upward, the present invention is by no means limited to such an arrangement. In other words, in a flue gas desulfurization system according to the present invention, one or more liquid film dust arresters may be arranged so as to face the corresponding respective gas flows that are not flowing out vertically upward, although one or more liquid film dust arresters are preferably arranged so as to face the corresponding respective gas flows that are flowing out vertically upward or downward.

The liquid film dust arrester 50 of this embodiment comprises a gas flow blocking plate 26 that is a gas flow blocking unit arranged vis-à-vis an updraft (gas outflow) and a liquid film forming unit 40 for forming liquid film in the flow path of the updraft that is produced between the gas flow blocking plate 26 and a gas discharge pipe 10.

Figure 2:
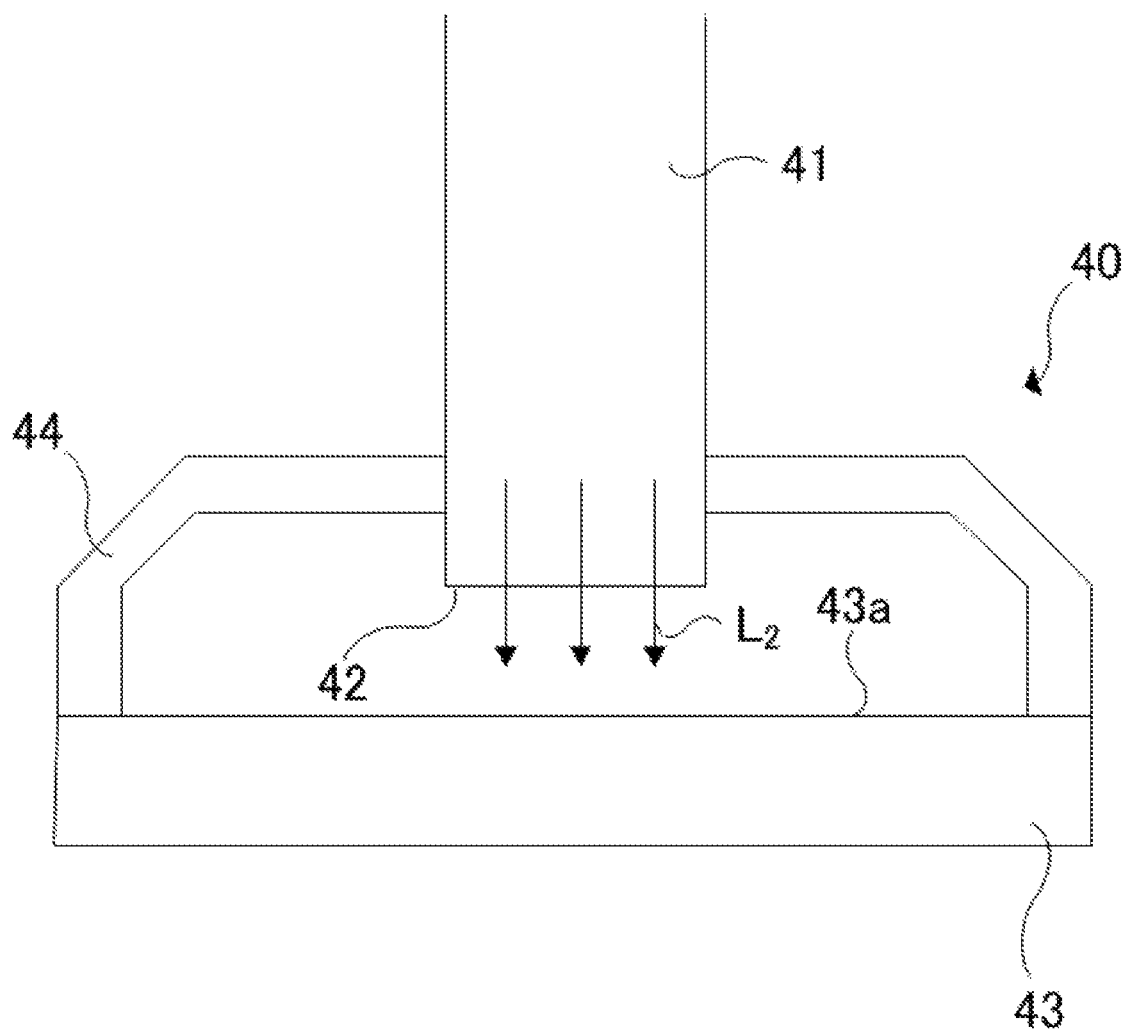
FIG. 2 is an enlarged schematic cross-sectional view taken along line II-II in FIG. 3, illustrating the configuration of the liquid film forming unit of the liquid film dust arrester shown in FIG. 1.

The liquid film forming unit 40 in turn comprises, as shown in FIG. 2, a liquid dispersion plate 43 (liquid dispersion unit) having a dispersion section 43a and a liquid lead-in pipe 41 (liquid ejection unit) having an ejection port 42 arranged vis-à-vis the dispersion section 43a to eject cleansing solution $L_2$ from the ejection port 42. The liquid dispersion plate 43 is arranged vis-à-vis the gas flow blocking plate 26 near the center of the gas flow blocking plate 26 and at an upstream position relative to the gas flow blocking plate 26 as viewed in the flowing direction of the updraft.

(Gas Flow Blocking Plate)

The gas flow blocking plate 26 of this embodiment shows an inverted dish-like profile and receives the gas flow rising up from the gas discharge pipe 10 at the lower surface (inner surface) thereof. When the gas flow contains liquid droplets, the liquid droplets stick to the lower surface of the gas flow blocking plate 26 to produce liquid film there at this time.

Additionally, the gas flow blocking plate 26 also receives, at the lower surface thereof, part of the cleansing solution $L_2$ that is dispersed by the liquid lead-in pipe 41, which will be described in greater detail hereinafter, and the liquid dispersion plate 43, and flows down part of the cleansing solution $L_2$ from the front edge thereof.

Note, however, that the overall profile of the gas flow blocking plate 26 is not subject to any particular limitations. For example, the gas flow blocking plate 26 may show an inverted dish-like profile as shown in FIG. 1. Then, a center part of the gas flow blocking plate 26 operates as gas flow blocking surface area for receiving a gas flow and a liquid flow-down wall surface area is formed along the peripheral edge of the gas flow blocking surface area. The liquid flow-down wall surface area may receive part of the cleansing solution $L_2$ heading for the gas flow blocking plate 26 and colliding with it and allow the part of the cleansing solution $L_2$ to flow down from the front edge thereof. Alternatively, the gas flow blocking plate 26 may show an umbrella-like profile, where the gas flow blocking plate 26 has a single surface area as a whole that operates as gas flow blocking surface area and also as liquid flow-down surface area.

The profile of the liquid flow-down wall surface area is not subject to any particular limitations. More specifically, the liquid flow-down wall surface area is only required to flow part of the cleansing solution $L_2$ that collides with the gas flow blocking plate 26 to flow down along its surface and drop down from its front edge. For example, the liquid flow-down wall surface area may be a flat surface area, a curved surface area, a concave surface area, a convex surface area or a surface area showing some other profile. Preferably, the liquid flow-down wall surface area is a smooth surface area.

The profile of the gas flow blocking surface area that is surrounded along its periphery by the liquid flow-down wall surface area is not subject to any particular limitations so long as it can receive an updraft and produce a liquid flow directed toward the liquid flow-down wall surface area out of the liquid that collides with it. For example, it may be a flat surface area, a curved surface area, a concave surface area, a convex surface area or a surface area showing some other profile.

If the gas flow blocking plate 26 has a single surface area as a whole that operates both as gas flow blocking surface area and as liquid flow-down wall surface area, its profile is not subject to any particular limitations. For example, the single surface area may be a flat surface area, a curved surface area, a concave surface area, a convex surface area or a surface area showing some other profile. Preferably, the single surface area is a smooth surface area.

(Liquid Film Forming Unit)

FIG. 2 is a schematic cross-sectional view of the liquid film forming unit 40, illustrating the configuration thereof. FIG. 2 is an enlarged schematic partial view of FIG. 1. The liquid film forming unit 40 of this embodiment comprises a liquid dispersion plate 43, a liquid lead-in pipe 41 and a support section 44.

Figure 3:
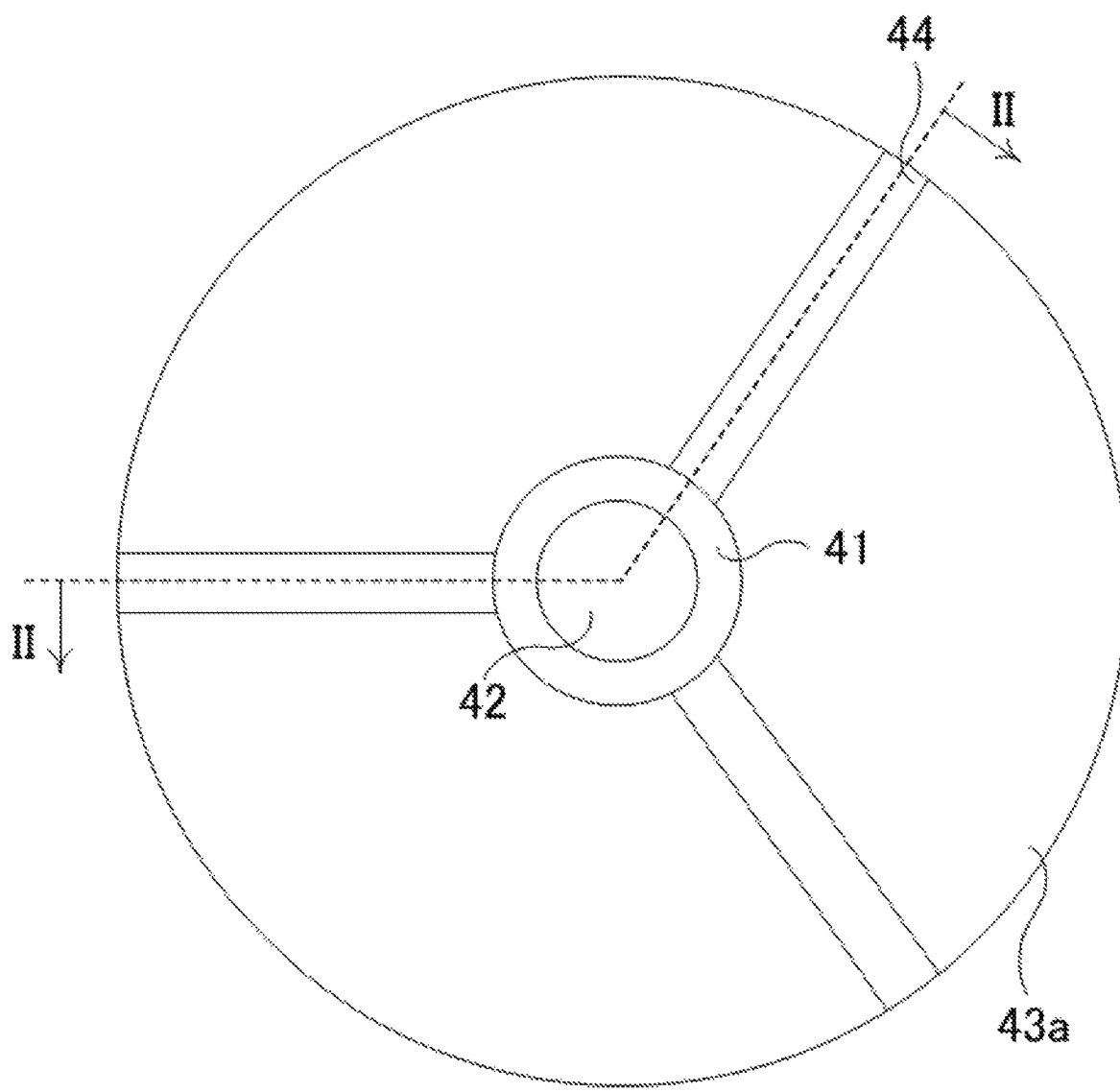
FIG. 3 is a schematic top view of the liquid dispersion unit of the liquid film forming unit shown in FIG. 2, illustrating the configuration thereof.
Figure 4:
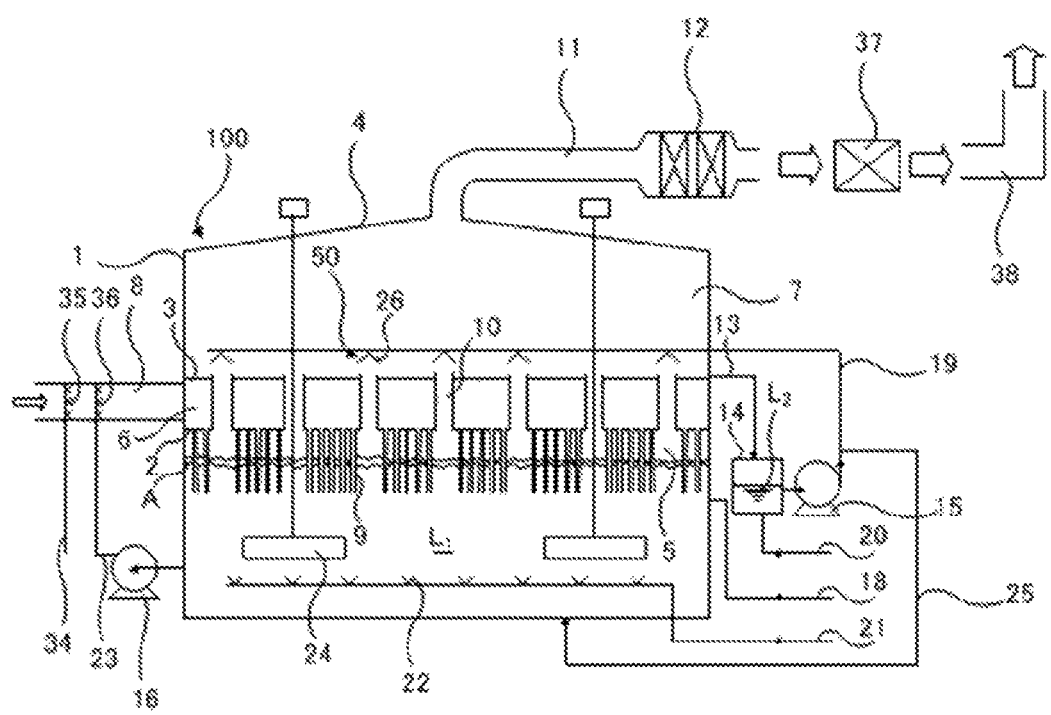
FIG. 4 is a schematic cross-sectional view of an embodiment of flue gas desulfurization system according to the present invention.

FIG. 3 is a schematic top view of the liquid film forming unit 40 comprising the liquid dispersion plate 43, the liquid lead-in pipe 41 and the support section 44, illustrating the configurations thereof. FIG. 2 is a cross-sectional view of the liquid dispersion plate 43 taken along line (broken line) II-II in FIG. 3, illustrating the configuration thereof.

(Liquid Lead-In Pipe)

Cleansing solution $L_2$ is ejected from the liquid lead-in pipe 41, which is the liquid ejection unit, and the ejected liquid $L_2$ is dispersed by the liquid dispersion plate 43, which is the liquid dispersion unit. At this time, cleansing solution $L_2$ is preferably dispersed in a direction that is n-fold symmetric (where n is an integer not smaller than 2) relative to the direction of ejection of cleansing solution $L_2$. Since the dispersion section 43a of the liquid dispersion plate 43 is a plane perpendicular to the direction of ejection of cleansing solution $L_2$ (a plane that makes n=∞), cleansing solution $L_2$ is ejected substantially uniformly in all directions of 360° from the point of ejection in a plane perpendicular to the direction of ejection of cleansing solution $L_2$.

Any liquid can be used as liquid (cleansing solution $L_2$) to be ejected from the liquid ejection unit. More specifically, any liquid such as water, including sea water that is easily available can be used as liquid to be ejected from the liquid ejection unit. Particularly, the use of water is preferable because no dust is produced if water droplets are left in the treated gas flow.

The liquid lead-in pipe 41 is arranged at the center part of the gas flow blocking plate 26 and runs through the center part of the gas flow blocking plate 26 in the vertical direction. Cleansing solution $L_2$ is fed into the liquid lead-in pipe 41 and ejected from the ejection port 42 of the liquid lead-in pipe 41 toward the liquid dispersion plate 43.

The ejection port 42 is arranged at a front end of the liquid lead-in pipe 41 so as to face downward. Thus, cleansing solution $L_2$ is fed to the ejection port 42 by way of the liquid lead-in pipe 41 and ejected vertically downward from the ejection port 42.

The liquid lead-in pipe 41 is hollow in the inside and may be so arranged as to eject cleansing solution $L_2$ directly from the front end thereof. Alternatively, the liquid lead-in pipe 41 may be provided at the front end thereof with a spray nozzle so as to eject (spray and disperse) cleansing solution $L_2$ by means of the spray nozzle.

The aperture diameter of the ejection port 42 is preferably not smaller than 5 mm and not greater than 20 mm. The ejection velocity of cleansing solution $L_2$ can easily be controlled within a predetermined range when the aperture diameter is within the above-described range.

The ejection velocity of cleansing solution $L_2$ is preferably not lower than 0.5 m/s and not higher than 3.0 m/s. Clogging of the ejection port 42 can be prevented from taking place when the ejection velocity of cleansing solution $L_2$ is within the above-described range.

While the ejection port 42 is arranged vis-à-vis the top surface of the liquid dispersion plate 43 and cleansing solution $L_2$ is ejected downward from the ejection port 42 in this embodiment, the ejection port 42 may alternatively be arranged vis-à-vis the bottom surface of the liquid dispersion plate 43 and cleansing solution $L_2$ may be ejected upward from the ejection port 42. In other words, the positional relationship of the ejection port 42 relative to the liquid dispersion plate 43 shown FIG. 2 may be turned upside down.

While the liquid lead-in pipe 41 runs through the gas flow blocking plate 26 and extends to a neighboring area of the liquid dispersion plate 43 in this embodiment, the present invention is by no means limited to such a positional arrangement. For example, the liquid lead-in pipe 41 may alternatively be made to get into the liquid film dust arrester 50 from a lateral side of the liquid film dust arrester 50 (between the gas flow blocking plate 26 and the gas discharge pipe 10) and extend to a neighboring area of the liquid dispersion plate 43.

(Liquid Dispersion Plate)

The liquid dispersion plate 43 is arranged so as to face the center and its neighboring area of the gas flow blocking plate 26. Furthermore, the liquid dispersion plate 43 is arranged to face the updraft coming up toward it. In other words, the liquid dispersion plate 43 is arranged at the upstream side of the updraft relative to the gas flow blocking plate 26. Namely, as shown in FIG. 1, the gas flow blocking plate 26 and the liquid dispersion plate 43 are arranged such that the top surface of the liquid dispersion plate 43 squarely faces the bottom surface of the gas flow blocking plate 26. Additionally, the liquid dispersion plate 43 is arranged such that it squarely faces the ejection port 42 of the liquid lead-in pipe 41 that projects downward from the center part of the gas flow blocking plate 26.

The material to be used for forming the liquid dispersion plate 43 is not subject to any particular limitations. However, the use of an abrasion-resistant and corrosion-resistant material is preferable when solid-containing water is ejected as cleansing solution $L_2$ and the solid contained in the ejected water is typically dust and/or gypsum. Examples of abrasion-resistant and corrosion-resistant materials that can be used for the liquid dispersion plate 43 include metals such as stainless steel and thermoplastic materials such as polypropylene and polyvinylchloride and particularly preferable materials include SUS836L and NAS254N.

The liquid dispersion plate 43 has a dispersion section 43a that is disposed vis-à-vis the ejection port 42 and the dispersion section 43a has a smooth surface.

The dispersion section 43a is the part of the liquid dispersion plate 43 that the cleansing solution $L_2$ ejected from the ejection port 42 collides with. Additionally, the cleansing solution $L_2$ ejected from the ejection port 42 flows on the dispersion section 43a and becomes dispersed. In other words, the dispersion section 43a operates both as cleansing solution $L_2$ impinging surface and as surface for flowing and dispersing cleansing solution $L_2$.

The liquid dispersion plate 43 is disk-shaped and its top surface that operates as dispersion section 43a is a circular flat surface. Note, however, that the liquid dispersion plate 43 and the disperse section 43a of a liquid film dust arrester according to the present invention is by no means limited to the above-described ones.

The dispersion section 43a may show any profile so long as it has a smooth surface and does not prevent cleansing solution $L_2$ from flowing smoothly. A dispersion section 43a having a smooth surface allows to form uniform liquid film and is not required to show a complex profile unlike any comparable conventional dispersion section 43a. Therefore, such a dispersion section 43a can advantageously be prepared with ease at low cost.

Thus, for instance, a surface where grooves are formed, a plate-like profile having protrusions thereon (as disclosed in Japanese Patent No. 3,621,159) and a non-smooth surface such as a pyramidal surface having ridge lines are not within the scope of the present invention. When the dispersion section 43a has a surface where grooves are formed, a plate-like profile having protrusions thereon or a non-smooth surface having ridge lines, areas where liquid densely flows and areas where liquid scarcely flows may arise on the non-smooth surface. Then, dispersion will become non-uniform on the dispersion section 43a and the dispersion section 43a will not be able to produce any uniform liquid film.

When cleansing solution $L_2$ that contains solids is ejected onto the liquid dispersion plate 43 and a non-uniform liquid flow is produced there, abrasion-induced local degradation can easily occur to the liquid dispersion plate 43. Such degradation entails a rise of running cost due to frequent component replacements. Additionally, when cleansing solution $L_2$ that contains a sticky component and a non-uniform liquid flow is produced there, local slow flows can easily arise on the liquid dispersion plate 43 and the sticky component adheres to the dispersion section 43a at the slow liquid flow areas. Then, the liquid dispersion plate 43a does not show the expected performance and requires frequent servicing operations.

For example, when the cleansing solution $L_2$ being employed in a liquid film dust arrester that is arranged in a flue gas desulfurization system contains dust and/or gypsum and the dispersion section 43a has a non-smooth surface, abrasion-induced local degradation occurs to the dispersion section 43a due to uneven liquid flows and dust and/or gypsum can locally stop moving and stick to the dispersion section 43a.

Therefore, preferably, the dispersion section 43a has a flat surface or a smooth convex surface that is upwardly curved toward the ejection port 42. When the dispersion section 43a has a flat surface or a smooth convex surface that is upwardly curved toward the ejection port 42, cleansing solution $L_2$ does not give rise to any slow flow and smoothly flows on the dispersion section 43a so that any component hardly sticks to the dispersion section 43a to make the servicing operation an easy one or unnecessary.

Example of profiles that the liquid dispersion plate 43 having the dispersion section 43a preferably shows include a disk-shaped profile, a cone-shaped (conical) profile, an inverted dish-shaped profile and a profile of part of a sphere (a profile obtained by cutting a sphere with a plane) such as a semispherical profile. The top surface of a liquid dispersion plate 43 having such a profile operates as dispersion section 43a. Additionally, a part having a profile that does not interfere with the flow of cleansing solution $L_2$ may be annexed to such a profile. A hat-like profile formed by a semispherical profile to the peripheral edge of which a hat rim-like profile is annexed may be an example of such a profile.

When the liquid dispersion plate 43 has a convex surface that is upwardly curved, it may be formed by using a plate-like member (for example, a hollow cone having no bottom) or a member having an upwardly curved profile and a solid inside (for example, a solid cone).

The dispersion section 43a is preferably n-fold symmetrical relative to the direction of ejection of cleansing solution $L_2$ of the ejection port 42, where n is an integer not smaller than 2. When the dispersion section 3a is n-fold symmetrical relative to the direction of ejection of cleansing solution $L_2$ of the ejection port 42, the cleansing solution $L_2$ that is dispersed on the dispersion section 43a becomes symmetrical relative to any surface direction and advantageously highly uniformly flows on the surface of the dispersion section 43a. The greater is the value of n, the better. Particularly, when n=∞, cleansing solution $L_2$ is advantageously dispersed substantially uniformly in all directions of 360°.

When the dispersion section 43a is a flat surface, preferably, cleansing solution $L_2$ is ejected from the ejection port 42 vertically downwardly and the dispersion section 43a is arranged horizontally. When the direction of ejection of cleansing solution $L_2$ and the flat surface of the dispersion section 43a are perpendicular relative to each other, cleansing solution $L_2$ is dispersed substantially symmetrically in all direction of 360° from the point of ejection to produce uniform liquid film.

(Support Section)

In this embodiment, the liquid dispersion plate 43 is supported by three support sections 44 that are arranged angularly at regular intervals.

The number and profile of support sections 44 are not subject to any particular limitations and any appropriate number and profile of support sections may be used for the purpose of the present invention. Additionally, the support sections 44 may be bonded to the liquid lead-in pipe 41 or, alternatively, they may be bonded to a member other than the liquid lead-in pipe 41.

(Formation of Liquid Film)

Cleansing solution $L_2$ is ejected from the ejection port 42 of the liquid lead-in pipe 41 that is located at or near the center of the dispersion section 43a of the liquid dispersion plate 43. The ejected cleansing solution $L_2$ spreads substantially uniformly from the center part toward the peripheral part of the dispersion section 43a and flows out from the liquid dispersion plate 43. The cleansing solution $L_2$ that flows out then scatters toward the inner wall of the gas discharge pipe 10, between the gas discharge pipe 10 and the gas flow blocking plate 26 and toward the bottom surface (inner surface) of the gas flow blocking plate 26.

Of the cleansing solution $L_2$ ejected from the ejection port 42, the part that flows between the gas discharge pipe 10 and the gas flow blocking plate 26 forms liquid film. The expression of liquid film as used for the purpose of the present invention is not limited to continuous liquid film but may take any other form so long as it allows gas-liquid contact to take place to a satisfactory extent between the formed liquid film and the gas flowing there. For example, liquid film may be in the form of discontinuous liquid droplets, in the form of mist or in the form of a multiple of liquid flow.

On the other hand, the part of the cleansing solution $L_2$ that scatters toward the bottom surface of the gas flow blocking plate 26 collides with the bottom surface thereof and then flows down from the front edge of the gas flow blocking plate 26. The part of the cleansing solution $L_2$ that scatters toward the inner wall of the gas discharge pipe 10 collides with the inner wall and then flows down. While these parts of the cleansing solution $L_2$ are not referred to as liquid film for the purpose of the present invention, the part of the cleansing solution $L_2$ that scatters toward the inner wall of the gas discharge pipe 10, the part of the cleansing solution $L_2$ that scatters toward the bottom surface of the gas flow blocking plate 26 and the part of the cleansing solution $L_2$ that flows down from the gas flow blocking plate 26 also contact the updraft to take part in the operation of taking in and removing the dust contained in the updraft.

The cleansing solution $L_2$ that is ejected from the ejection port 42 contacts practically only the dispersion section 43a of the liquid dispersion plate 43 and flows out toward between the gas discharge pipe 10 and the gas flow blocking plate 26 and in some other directions. Therefore, in this embodiment, the ejected cleansing solution $L_2$ practically contacts only the top surface of the liquid dispersion plate 43 and hence the top surface of the liquid dispersion plate 43 where cleansing solution $L_2$ contacts is referred to as dispersion section 43a. On the other hand, in this embodiment, only a small part of the cleansing solution $L_2$ that is ejected from the ejection port 42 may become droplets and fall down along the lateral surface of the liquid dispersion plate 43. However, such contact does not give rise to any dispersion of cleansing solution $L_2$ and hence the lateral surface of the liquid dispersion plate 43 does not belong to the dispersion section 43a.

In this embodiment, the updraft (including the gas flow produced after the updraft collides with the gas flow blocking plate 26) passes between the gas discharge pipe 10 and the gas flow blocking plate 26 without fail.

The updraft moving up from the gas discharge pipe 10 directly flows into the flow path formed between the gas discharge pipe 10 and the gas flow blocking plate 26 or collides with the bottom surface of the gas flow blocking plate 26 and then is guided by the bottom surface of the gas flow blocking plate 26 to change its flow direction and flows into the flow path formed between the gas flow blocking plate 26 and the gas discharge pipe 10.

While all the updraft may not necessarily pass through the above-described flow paths and get to the liquid film, at least it passes through the flow path formed between the gas discharge pipe 10 and the gas flow blocking plate 26.

Therefore, in this embodiment, liquid film is formed in the flow path of the updraft produced between the gas discharge pipe 10 and the gas flow blocking plate 26. The liquid film is formed vis-à-vis the updraft that flows through the flow path produced between the gas discharge pipe 10 and the gas flow blocking plate 26. Then, the dust contained in the updraft is taken into the liquid film and removed as the updraft flows through the flow path.

(Area S1 of Ejection Port, Area S2 of Smooth Surface)

The ratio of the area S1 of the aperture of the ejection port 42 to the area S2 of the dispersion section 43a that is a smooth surface (and hence the region where cleansing solution $L_2$ contacts), or S1/S2, is preferably not smaller than 0.001 and not greater than 0.06, more preferably not smaller than 0.003 and not greater than 0.04.

(Distance Between Ejection Port and Dispersion Section)

The distance separating the ejection port 42 and the dispersion section 43a is preferably not less than 3 mm and not more than 50 mm, more preferably not less than 5 mm and not more than 30 mm. The ejection port 42 can effectively be prevented from being clogged when the distance between the ejection port 42 and the dispersion section 43a is within the above range.

(Flow Rate of Cleansing Solution)

The flow rate of cleansing solution $L_2$ ejected from the ejection port 42 is normally not smaller than 0.1 kg/hr and not greater than 10 kg/hr, preferably not smaller than 0.2 kg/hr and not greater than 2 kg/hr, based on 1 m³/hr of gas as reduced to the standard condition of moving up from the gas discharge pipe 10. The dust contained in the gas moving up from the gas discharge pipe 10 can effectively be removed when cleansing solution $L_2$ at any of the foregoing flow rates is ejected at the above defined flow rate and dispersed to form liquid film.

A liquid film dust arrester according to the present invention can be used for any application provided that a sufficient area is secured to install the liquid film dust arrester, although it may typically be installed in a flue gas desulfurization system.

<Flue Gas Desulfurization System>

Now, a flue gas desulfurization system according to the present invention will be described below. A flue gas desulfurization system according to the present invention comprises one or more liquid film dust arresters according to the present invention as described above.

(General Description of Flue Gas Desulfurization System)

The embodiment of flue gas desulfurization system that will be described below is a wet flue gas desulfurization system, which is also referred to as jet bubbling reactor (JBR) type flue gas desulfurization system, that desulfurizes sulfur oxides-containing combustion exhaust flue gas (gas to be treated) by means of gas-phase dispersion type gas-liquid contacting devices and an absorber solution containing an alkali agent. In a jet bubbling reactor type system, absorber solution for removing sulfur oxides is contained in a bottom part of a sealed vessel, which is a reaction vessel, and flue gas and air (oxygen) are introduced into the absorber solution to cause gas-liquid contact of the sulfur oxides in flue gas and the liquid alkali agent in the absorber solution to take place in the presence of oxygen and make them react with each other, while forming a jet bubbling layer (froth layer).

Sulfur oxides (SOx) to be treated by this embodiment typically include sulfur dioxide. Sulfur dioxide is produced in many different ways. For example, sulfur dioxide is produced particularly when sulfurous gas is dissolved in water. Sulfur oxides-containing combustion exhaust flue gas (exhaust gas) is typically emitted from furnaces and power generation plants where coal is burnt.

As is well known, as sulfur oxides such as $SO_2$ contained in flue gas is made to react with an alkali agent and oxygen, hardly soluble solids are produced and sulfur oxides are removed from the flue gas. For instance, when sulfur oxides contained in flue gas include $SO_2$ and limestone ($CaCO_3$) is employed as alkali agent for desulfurization, a reaction expressed by formula (1) shown below takes place to produce gypsum ($CaSO_4.2H_2O$) so that $SO_2$ can be removed from flue gas.

$$SO_2+2H_2O+\tfrac{1}{2}O_2+CaCO_3 \rightarrow CaSO_4.2H_2O+CO_2 \quad (1)$$

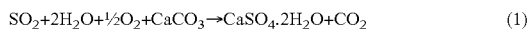

Note that flue gas contains not only sulfur oxides but also soot and dust. Just like sulfur oxides, the soot and dust contained in flue gas to be treated are also removed as flue gas and absorber solution are brought into gas-liquid contact in the froth layer of the flue gas desulfurization system. More specifically, the soot and dust contained in flue gas is removed as flue gas and the cleansing solution are brought into gas-liquid contact at the liquid film dust arresters that the flue gas desulfurization system comprises.

(Overall Configuration of Flue Gas Desulfurization System)

FIG. 1 is a schematic cross-sectional view of an embodiment of flue gas desulfurization system according to the present invention, illustrating the configuration thereof.

The entire flue gas desulfurization system 100 of this embodiment is contained in a large-size sealed vessel 1, in which sulfur oxides and dust are removed from flue gas that contains sulfur oxides and dust.

The inside of the sealed vessel 1 is partitioned into a first chamber 5, a second chamber 6 which is located adjacent to and above the first chamber 5 and a third chamber 7 which is located adjacent to and above the second chamber 6 by first partition board 2 and second partition board 3 which is located above the first partition board 2. The upper space of the third chamber 7 is sealed by a ceiling plate 4.

(First Partition Board, Second Partition Board)

The first partition board 2 is a substantially horizontal board.

The second partition board 3 is also a substantially horizontal board.

(Second Chamber, Flue Gas Cooling Device)

The peripheral wall of the second chamber 6 is provided with a flue gas inlet. A flue gas lead-in duct 8 is coupled to the flue gas inlet.

Absorber solution $L_1$ that is contained in the first chamber 5, which will be described in greater detail hereinafter, is sprayed into the flue gas lead-in duct 8 from absorber solution nozzle 36 by way of absorber solution extraction pipe 23. Absorber solution $L_1$ is drawn out from the first chamber 5 by means of a circulation pump 16 and fed into the absorber solution extraction pipe 23.

Additionally, industrial water that is supplied from an industrial water source (not shown) is sprayed into the flue gas lead-in duct 8 from industrial water nozzle 35 by way of industrial water pipe 34.

More specifically, in this embodiment, a flue gas cooling device is coupled to the flue gas inlet arranged at the peripheral wall of the sealed vessel 1 and the flue gas that is cooled by the flue gas cooling device (and additionally subjected to a dust removal operation and a desulfurization operation to some extent) is led into the sealed vessel 1 by way of the flue gas inlet. In this embodiment, the flue gas cooling device comprises the flue gas lead-in duct 8, the circulation pump 16, the industrial water pipe 34, the industrial water nozzle 35, the absorber solution extraction pipe 23 and the absorber solution nozzle 36, although the makeup of the flue gas cooling device is not limited to the above-described one. In other words, the makeup of the flue gas cooling device is not subject to any particular limitations so long as it is so arranged as to be able to cool the flue gas that is led into it. For example, the flue gas cooling device may comprise only either the industrial water nozzle 35 or the absorber solution nozzle 36 and may additionally comprise some other cooling mechanism.

While no additional unit needs to be installed in the space in the second chamber 6, if desired, a spray nozzle (not shown) for spraying absorber solution $L_1$ may be installed in the space. When absorber solution $L_1$ is to be sprayed into the space of the second chamber 6, absorber solution $L_1$ contained in the first chamber 5 can be fed into the second chamber 6 by branching the absorber solution extraction pipe 23.

(Through Holes, Flue Gas Dispersion Pipes)

The first partition board 2 is provided with a large number of through holes that allow the first chamber 5 and the second chamber 6 to communicate with each other. A large number of flue gas dispersion pipes 9 extend downward from the respective through holes in order to cause the flue gas fed into the second chamber 6 to disperse in the absorber solution $L_1$ contained in the first chamber 5. More specifically, the flue gas dispersion pipes 9 are arranged to extend downward from the respective through holes so as to make the front tips of the flue gas dispersion pipes 9 dip into the absorber solution $L_1$ contained in the first chamber 5. Thus, the flue gas that is led into the second chamber 6 is then blown into the absorber solution $L_1$ contained in the first chamber 5 by way of the flue gas dispersion pipes 9.

Each of the flue gas dispersion pipes 9 is provided at the peripheral wall thereof with one or more than one dispersion hole for discharging flue gas, which one or more than one dispersion holes are arranged in the region of the pipe located below the surface level of the absorber solution $L_1$ in the first chamber 5. Preferably, each of the flue gas dispersion pipes 9 is provided with a plurality of dispersion holes.

The profile and the positional arrangement of the dispersion holes are not subject to any particular limitations so long as they can effectively and excellently disperse flue gas in the absorber solution $L_1$ contained in the first chamber 5. An exemplar arrangement may be such that the dispersion holes of each of the flue gas dispersion pipes 9, which are cylindrical pipes, show a circular cross section and are arranged at positions separated from the bottom ends of the flue gas dispersion pipes 9 by a predetermined distance in the direction perpendicular to the extending direction of the dispersion pipe 9, any two adjacently located dispersion holes of each of the flue gas dispersion pipes 9 being separated by an angle of 30° as viewed from the central axis of the flue gas dispersion pipe 9 (so that a total of 12 dispersion holes are arranged at angularly regular intervals in the direction perpendicular to the extending direction of the flue gas dispersion pipe 9).

(First Chamber)

Absorber solution $L_1$ is contained in the first chamber 5. Absorber solution $L_1$ is fed into the first chamber 5 by way of absorber solution feed pipe 18.

Absorber solution $L_1$ of this embodiment contains an alkali agent. The alkali agent contained in absorber solution $L_1$ is a neutralizer agent for neutralizing acid. Examples of such neutralizer agents include calcium carbonate (limestone) and sodium hydroxide. The solvent to be used for alkali agent-containing absorber solution $L_1$ that can be used for this embodiment may typically be water.

Note, however, absorber solution $L_1$ is not subject to any particular limitations so long as it can absorb sulfur oxides.

Stirrers 24 and oxygen-containing gas spouting jet nozzles 22 to be used, whenever necessary, for supplying oxygen into the absorber solution $L_1$ in the first chamber 5 are arranged in the first chamber 5.

The oxygen-containing gas spouting jet nozzles 22 supply air (oxygen) to the alkali agent-containing absorber solution $L_1$ and also to the flue gas in the first chamber 5. Air is supplied to the oxygen-containing gas spouting jet nozzles 22 from a feed blower (not shown) by way of an oxygen-containing gas feed pipe 21. It is sufficient for the oxygen-containing gas spouting jet nozzles 22 that they can only supply oxygen-containing gas (gas for oxidation) and not air but only oxygen or any gas other than air that contains oxygen may alternatively be supplied to the jet nozzles 22.

As described above, flue gas is blown into the absorber solution $L_1$ from the second chamber 6 by way of the flue gas dispersion pipes 9. The flue gas that is blown into the absorber solution $L_1$ then moves upward in the absorber solution $L_1$ contained in the first chamber 5 as bubbles. Thus, a froth layer A in a mixed phase of bubbles and absorber solution $L_1$ is formed immediately above the level of the dispersion holes of the flue gas dispersion pipes 9 in the first chamber 5. While flue gas moves up in the absorber solution $L_1$ as bubbles and while flue gas stays in the froth layer A as bubbles, the dust and the sulfur oxides contained in the flue gas are seized in the absorber solution $L_1$ and then removed from the flue gas.

The flue gas that is cleansed (desulfurized) in the above-described manner is then allowed to move upward from the froth layer A and dissipate in the upper space. Thereafter, it is led into the third chamber 7 by way of gas discharge pipes 10, which will be described in greater detail hereinafter.

(Apertures, Gas Discharge Pipes)

The first partition board 2 and the second partition board 3 are provided with a same number of apertures. The apertures of the first partition board are arranged squarely vis-à-vis the corresponding respective apertures of the second partition boards 3 to form so many aperture pairs. A gas discharge pipe 10 is arranged to connect each of the aperture pairs so as to close the inner space of the second chamber 6 and hold the first chamber 5 and the third chamber 7 in communication with each other. The gas discharge pipes 10 allow the desulfurized flue gas staying in the upper space of the first chamber 5 to be led into the third chamber 7.

The upper ends of the gas discharge pipes 10 project upward from the top surface of the second partition board 3 that surrounds them so as to make a predetermined amount of cleansing solution $L_2$ stay on the second partition board 3.

The horizontal cross section of each of the gas discharge pipes 10 may be of any shape such as circular, square or rectangular.

(Third Chamber)

A plurality of liquid film dust arresters 50 according to the present invention are arranged in the third chamber 7 respectively above the outlets of the corresponding gas discharge pipes 10.

The ceiling board 4 arranged at the top of the third chamber 7 is provided with a desulfurized flue gas outlet and a desulfurized flue gas lead-out duct 11 is coupled to the desulfurized flue gas outlet.

Note that the desulfurized flue gas outlet may alternatively be arranged at the peripheral wall of the third chamber 7.

Liquid film of cleansing solution $L_2$ is formed in the flow path between the gas discharge pipes 10 and the gas flow blocking plates 26 that the liquid film dust arresters 50 have by the liquid film dust arresters 50 that are arranged in the third chamber 7 squarely above the respective corresponding gas discharge pipes 10. The flue gas discharged from the gas discharge pipes 10 passes through the liquid film of cleansing solution $L_2$. At this time, the flue gas contacts the liquid film of gas cleansing solution $L_2$ and the dust remaining in the flue gas is seized by the liquid film and removed from the flue gas.

(External Structure of Sealed Vessel)

The desulfurized flue gas in the third chamber 7 is drawn out to the outside of the third chamber 7 (of the sealed vessel 1) by way of desulfurized flue gas lead-out duct 11. Thereafter, the flue gas drawn out from the third chamber 7 is led into mist eliminator 12, in which mist eliminator 12 the absorber solution $L_1$, the particles in the absorber solution $L_2$ and other components that are contained in the flue gas are further removed. Then, the desulfurized flue gas discharged from the mist eliminator 12 gets into heater 37, in which heater 37 the mist remaining in the desulfurized flue gas is gasified and then discharged into the atmosphere by way of flue gas chimney 38.

A circulation line for causing the cleansing solution $L_2$ staying on the second partition board 3 that operates as the bottom surface of the third chamber 7 to circulate into the liquid film dust arresters 50 in the third chamber 7 is arranged outside the sealed vessel 1. The circulation line comprises cleansing solution discharge pipe 13 for drawing out the cleansing solution $L_2$ fed onto the second partition board 3, cleansing solution tank 14 for storing the drawn-out cleansing solution $L_2$, circulation pump 15 for circulating the cleansing solution $L_2$ from the cleansing solution tank 14 and cleansing solution feed pipe 19 coupled to the circulation pump 15 to feed the cleansing solution $L_2$ into the third chamber 7 (liquid lead-in pipes 41). The cleansing solution tank 14 is coupled to cleansing solution replenishing pipe 20 for replenishing cleansing solution so that cleansing solution is replenished by way of the cleansing solution replenishing pipe 20.

Preferably, part of the cleansing solution $L_2$ that is circulated into the liquid film dust arresters 50 is led into the absorber solution $L_1$ by way of conduit 25 branched from the cleansing solution feed pipe 19. With such a cleansing solution $L_2$ lead-in operation, the component composition of the cleansing solution $L_2$ circulating into the liquid film dust arresters 50 can be held within a predetermined range and hence the solid component removing capability of the cleansing solution $L_2$ can be maintained at a high level.

The cleansing solution tank 14 operates as storage tank for temporarily storing the cleansing solution $L_2$ staying on the top surface of the second partition board 3 that operates as the floor surface of the third chamber 7 and at the same time for receiving and storing the cleansing solution for replenishment.

Note that the installation of the cleansing solution tank 14 is not indispensably required. In other words, the cleansing solution tank 14 may be omitted and the cleansing solution discharge pipe 13 may be directly coupled to the circulation pump 15. In the instance of the latter arrangement, the cleansing solution replenishing pipe 20 is coupled to the cleansing solution discharge pipe 13 or the cleansing solution feed pipe 19 so as to directly supply the cleansing solution for replenishment.

The above-described embodiment of liquid film dust arrester 50 and that of flue gas desulfurization system 100 can form substantially uniform liquid film and achieve a high dust removing performance, although they require neither complex processing steps for preparing the liquid dispersion plate 43 nor additional dust removing equipment and hence can be provided at low cost. Additionally, the described embodiment of liquid film dust arrester 50 and that of flue gas desulfurization system 100 are practically free from degradation and solid adhesion due to local wear even when they are operated to eject cleansing solution $L_2$ that contains solids (gypsum and dust) to produce liquid film because the dispersion section 43a of the liquid dispersion plate 43 is a smooth surface. Thus, they provide an advantage of excellent durability and easy servicing.

This application claims the benefit of Japanese Patent Application No. 2015-238296, filed on Dec. 7, 2015, which is hereby incorporated by reference herein in its entirety.

REFERENCE SIGNS LIST

1: sealed vessel
2: first partition board
3: second partition board
4: ceiling board
5: first chamber
6: second chamber
7: third chamber
8: flue gas lead-in duct
9: flue gas dispersion pipe
10: gas discharge pipe
11: desulfurized flue gas lead-out duct
12: mist eliminator
13: cleansing solution discharge pipe
14: cleansing solution tank
15: circulation pump
16: circulation pump
18: absorber solution feed pipe
19: cleansing solution feed pipe
20: cleansing solution replenishing pipe
22: oxygen-containing gas spouting jet nozzle
23: absorber solution extraction pipe
24: stirrer
25: conduit
26: gas flow blocking plate
34: industrial water pipe
35: industrial water nozzle
36: absorber solution nozzle
37: heater
38: flue gas chimney
40: liquid film forming unit
41: liquid lead-in pipe
42: ejection port
43: liquid dispersion plate
43a: dispersion section
44: support section
50: liquid film dust arrester
100: flue gas desulfurization system
$L_1$: absorber solution
$L_2$: cleansing solution
A: froth layer

The invention claimed is:

1. A liquid film dust arrester configured to face a gas flow flowing out from a gas discharge pipe and to take dust in the gas flow into a liquid film in order to remove the dust from the gas flow, the dust arrester comprising:
- a gas flow blocking unit arranged downstream from the gas discharge pipe in a direction of the gas flow;
- a liquid dispersion unit having a dispersion section arranged at a position near the center of the gas flow blocking unit and upstream relative to the gas flow blocking unit as viewed in the flowing direction of the gas flow so as to face the gas flow blocking unit;
- a liquid ejection unit having an ejection port disposed upstream of the dispersion section in a direction of a liquid flow and being configured to eject liquid from the ejection port; and
- a liquid film forming unit configured to form the liquid film in the flow path of the gas flow between the gas flow blocking unit and the gas discharge pipe,
- characterized in that the dispersion section comprises a smooth surface which operates to cause the liquid ejected from the ejection port toward the dispersion section to flow and disperse on the smooth surface and that the liquid film is so formed as to face the gas flow flowing through the flow path.

2. The liquid film dust arrester according to claim 1, characterized in that the dispersion section is n-fold symmetric, wherein n is an integer not smaller than 2, relative to the direction of ejection of the liquid from the ejection port.

3. The liquid film dust arrester according to claim 1, characterized in that the smooth surface is a flat surface or has a convex shape toward the ejection port.

4. The liquid film dust arrester according to claim 1, characterized in that the smooth surface is arranged perpendicularly relative to the direction of ejection of the liquid from the ejection port.

5. The liquid film dust arrester according to claim 1, characterized in that the ratio of area S1 of the ejection port to area S2 of the smooth surface, or S1/S2, is not smaller than 0.001 and not greater than 0.06.

6. The liquid film dust arrester according to claim 1, characterized in that the distance between the ejection port and the dispersion section is not less than 3 mm and not more than 50 mm.

7. A flue gas desulfurization system for removing sulfur oxides and dust from flue gas containing the sulfur oxides and the dust, the system comprising:
- a sealed vessel, the inside of the sealed vessel being partitioned by a first partition board and a second partition board located above the first partition board into a first chamber, a second chamber arranged above and adjacent to the first chamber and a third chamber arranged above and adjacent to the second chamber;
- a flue gas inlet to the second chamber;
- a desulfurized gas outlet from the third chamber;
- one or more through holes formed through the first partition board;
- one or more flue gas dispersion pipes extending downwardly from the corresponding respective through holes to bring the first chamber and the second chamber into communication with each other so as to be able to disperse the flue gas fed into the second chamber into an absorber solution contained in the first chamber in order to absorb sulfur oxides from the dispersed flue gas;
- one or more gas discharge pipes keeping the first chamber and the third chamber in communication with each other and having top ends thereof projected upward from the top surface of the second partition board; and
- one or more liquid film dust arresters arranged so as to respectively face the gas flows flowing out upward from the corresponding gas discharge pipes and take the dust in the gas flows into a liquid film in order to remove the dust from the gas flows,
- characterized in that at least one of the liquid film dust arresters is a liquid film dust arrester according to claim 1.

8. The flue gas desulfurization system according to claim 7, characterized in that the gas flow flowing out from the gas discharge pipe is desulfurized flue gas.

* * * * *